US00RE40140E

(19) United States
(12) Reissued Patent
Mihan et al.

(10) Patent Number: US RE40,140 E
(45) Date of Reissued Patent: Mar. 4, 2008

(54) POLYMERIZATION CATALYST USED FOR PRODUCING POLYOLEFINS THAT HAVE EXCELLENT COMBINED PROPERTIES

(75) Inventors: Shahram Mihan, Bad Soden (DE); Martin Lux, Schwarzenbach (DE); Wolfgang Rohde, Speyer (DE); Andreas Deckers, Flomborn (DE); Peter Kölle, Köln-Rodenkirchen (DE); Heinz Vogt, Frankfurt (DE)

(73) Assignee: Basell Polyolefine GmbH (DE)

(21) Appl. No.: 11/541,519

(22) PCT Filed: May 14, 2001

(86) PCT No.: PCT/EP01/05452

§ 371 (c)(1),
(2), (4) Date: Dec. 3, 2002

(87) PCT Pub. No.: WO01/90204

PCT Pub. Date: Nov. 29, 2001

Related U.S. Patent Documents

Reissue of:
(64) Patent No.: 6,897,181
Issued: May 24, 2005
Appl. No.: 10/276,618
Filed: Dec. 3, 2002

(30) Foreign Application Priority Data

May 22, 2000 (DE) ..... 100 252 923

(51) Int. Cl.
*B01J 27/06* (2006.01)
*B01J 21/08* (2006.01)
*B01J 35/08* (2006.01)
*B01J 13/00* (2006.01)
*C01B 33/12* (2006.01)

(52) U.S. Cl. ..... 502/224; 502/233; 502/237; 502/240; 502/254; 502/253; 502/228; 502/9; 516/111; 423/338; 526/106

(58) Field of Classification Search ..... 502/224, 502/233, 237, 240, 254, 256, 228, 9; 516/111; 423/338; 526/106
See application file for complete search history.

(56) References Cited

U.S. PATENT DOCUMENTS 3,130,188 A * 4/1964 Hogan ..... 526/98
3,862,104 A * 1/1975 Witt ..... 526/106
3,872,217 A * 3/1975 Merz et al. ..... 423/338
4,042,769 A * 8/1977 Lynch ..... 526/106
4,130,505 A * 12/1978 Nasser et al. ..... 502/203
4,206,297 A * 6/1980 Hoff et al. ..... 502/256
5,310,712 A * 5/1994 Funk et al. ..... 502/9
5,352,658 A * 10/1994 Evertz et al. ..... 502/107
5,455,216 A * 10/1995 Mueller et al. ..... 502/256
5,625,013 A * 4/1997 Mueller et al. ..... 526/106
6,645,900 B2 * 11/2003 de Lange et al. ..... 502/87

FOREIGN PATENT DOCUMENTS

DE 2 103 243 * 8/1972
DE 25 40 279 * 3/1977
EP 0 535 516 * 9/1992
EP 0 555 747 * 2/1993
EP 0 589 350 * 9/1993
EP 0 589 472 * 9/1993

OTHER PUBLICATIONS

"Polymere Wirkstoffe", vol. III, Stutgart, New York, Thieme Verlag, pp. 70 (1984), no month available.*
McDaniel, "Supported Chromium Catalyst for Ethylene Polymerization", Advances in Catalysis, vol. 33, pp. 47–98 (1985), no month available.*

* cited by examiner

*Primary Examiner*—J. A. Lorengo
*Assistant Examiner*—Patricia L. Hailey
(74) *Attorney, Agent, or Firm*—Connolly Bove Lodge & Hutz LLP

(57) ABSTRACT

The invention relates to a process for preparing a catalyst for the polymerization of olefins, which comprises:

a) preparation of a finely divided silica xerogel,
b) loading of the xerogel with chromium from a solution of chromium trioxide or a chromium compound which is converted into chromium trioxide under the conditions of step c), and
c) activation of the resulting product at from 400 to 1100° C. in a water-free gas stream comprising oxygen in a concentration of above 10% by volume, wherein a fluoride doping with a fluorinating agent is carried out in step b) or in step c). Furthermore, the invention relates to a catalyst for the polymerization of olefins which is obtainable by the process of the invention and to a process for the polymerization of olefins in which an olefin or an olefin mixture is polymerized in the presence of a catalyst according to the invention.

14 Claims, No Drawings

POLYMERIZATION CATALYST USED FOR PRODUCING POLYOLEFINS THAT HAVE EXCELLENT COMBINED PROPERTIES

Matter enclosed in heavy brackets [ ] appears in the original patent but forms no part of this reissue specification; matter printed in italics indicates the additions made by reissue.

The invention relates to a polymerization catalyst based on chromium catalysts supported on silica gel.

Polymerization catalysts comprising silica gel or modified silica gel as support material and chromium as active component play an important role in the preparation of high density polyethylene (HDPE). The conditions under which the supports and the catalysts are prepared determine the chemical composition, pore structure, particle size and shape of the catalysts. Prior to the polymerization, the catalysts are activated at high temperatures to stabilize chromium as Cr(VI) species on the catalyst surface. This species is reduced by addition of ethylene or of reducing agents to form the catalytically active species which catalyzes the polymerization. The composition of the catalyst, its structure and the activation conditions have a critical influence on the performance of the catalyst in the polymerization process, the activity of the catalyst, the structure and the properties of the polymer formed.

Despite intensive studies, the exact details as to how these catalysts influence the polymerization kinetics and polymer properties have not yet been fully elucidated. Small changes in the composition or structure of the catalyst therefore frequently lead to surprising effects.

U.S. Pat. No. 3,130,188 relates to a chromium oxide catalyst supported on silica gel, which is, before it is activated, doped with inorganic fluorides such as ammonium hexafluorosilicate. This catalyst displays an increased polymerization activity and the polyethylene obtained has a narrow molecular weight distribution.

In Advances in Catalysis, 33, 47–98, 1985, M. P. McDaniel discloses that fluorine-doped Cr(VI)/silica gel catalysts have an increased activity at low calcination temperatures. Furthermore, it is stated that the electronic environment of the chromium is changed significantly by the fluoride doping, which is given as an explanation of a suppressed termination rate. The molecular weight distribution of some of the polymers obtained becomes narrower, which indicates a more uniform environment around the chromium.

DE-A 25 40 279 relates to a process for preparing a catalyst for the polymerization of olefins based on Cr(VI)/silica gel, in which the support material is a silica xerogel which is prepared in a specific way. This xerogel is loaded with chromium trioxide or a chromium compound which is converted into chromium trioxide on subsequent activation and is subsequently activated at from 400 to 1000° C. in a water-free gas stream comprising oxygen in a concentration of >10% by volume.

The invention starts out from a process for preparing a catalyst for the polymerization of olefins as described in DE-A 25 40 279, which comprises:

a) preparation of a finely divided silica xerogel by
  - a1) use of a particulate silica hydrogel which contains from 10 to 25% by weight of solid (calculated as $SiO_2$), is largely spherical and has a particle diameter of from 1 to 8 mm and is obtained by
    - a11) introduction of a sodium or potassium water glass solution into a rotating stream of an aqueous mineral acid, both longitudinally and tangentially to the stream,
    - a12) spraying of droplets of the resulting silica hydrosol into a gaseous medium,
    - a13) allowing the sprayed hydrosol to solidify in the gaseous medium,
    - a14) freeing the resulting largely spherical particles of the hydrogel of salts without prior aging by washing,
  - a2) extraction of at least 60% of the water present in the hydrogel by means of an organic liquid,
  - a3) drying of the resulting gel [up to] *until the dried product experiences no further weight loss at* 180° C and a reduced pressure of 13 mbar [no further weight loss occurs over a period of] *for* 30 minutes (xerogel formation)
  - a4) adjustment of the particle diameter of the xerogel obtained to from 20 to 2000 μm, b) loading of the xerogel with chromium from a solution of chromium trioxide or a chromium compound which is converted into chromium trioxide under the conditions of step c), and c) activation of the resulting product at from 400 to 1100° C. in a water-free gas stream comprising oxygen in a concentration of above 10% by volume.

It is an object of the present invention to further develop this process for preparing a catalyst based on Cr(VI)/silica gel. The catalyst obtained should be suitable for preparing polyethylene or ethylene copolymers having an improved property profile. In particular, polyethylene having a balanced ratio of environmental stress cracking resistance to impact toughness should be obtained.

The process of the invention is characterized in that a fluoride doping with a fluorinating agent is carried out in step b) or c).

The process of the invention makes it possible to prepare polyolefins, in particular polyethylene or ethylene copolymers, having balanced product properties. In particular, polymers having a high environmental stress cracking resistance combined with high impact toughness are obtained. These properties usually run counter to one another.

The preparation of the catalyst support and the application of the chromium are carried out as described in DE-A 25 40 279.

Step a)

In the first step of the preparation of the support material, it is important that a silica hydrogel which has a relatively high solids content of from 10 to 25% by weight (calculated as $SiO_2$), preferably from 12 to 20% by weight, particularly preferably from 14 to 20% by weight, and is largely spherical is used. This silica hydrogel is prepared in a specific way which is described in steps a11) to a14). The steps a11) to a13) are described in more detail in DE-A 21 03 243. Step a14), viz. washing of the hydrogel, can be carried out in any desired way, for example according to the countercurrent principle using water which is at a temperature of 80° C. and has been made slightly alkaline by means of ammonia (pH up to about 10).

The extraction of the water from the hydrogel (step a2)) is preferably carried out by means of an organic liquid, which is particularly preferably miscible with water, selected from the group consisting of $C_1$–$C_4$-alcohols and $C_3$–$C_5$-ketones. Particularly preferred alcohols are tert-butanol, i-propanol, ethanol and methanol. Among the ketones, acetone is preferred. The organic liquid can also comprise a mixture of the abovementioned organic liquids, and in any case the organic liquid contains less than 5% by weight, preferably less than 3% by weight, of water prior to the extraction. The extraction can be carried out in customary extraction apparatuses, e.g. column extractors.

Drying (step a3)) is preferably carried out at from 30 to 140° C., particularly preferably from 80 to 110° C., and at pressures of preferably from 1.3 mbar to atmospheric pressure. Here, because of the vapor pressure, an increasing temperature should be combined with an increasing pressure and vice versa.

The setting of the particle diameter of the xerogel obtained (step a4)) can be carried out by any appropriate method, e.g. by milling and sieving.

Step b)

The chromium trioxide is preferably applied to the xerogel from a 0.05–5% strength by weight solution of chromium trioxide in a $C_3$–$C_5$-ketone or from a 0.05–15% strength by weight solution of a chromium compound which is converted into chromium trioxide under the conditions of step c) in a $C_1$–$C_4$-alcohol, where the respective solvent must contain no more than 20% by weight of water. The xerogel is suspended in the solution of the respective chromium compound and the liquid constituents of the reaction mixture are evaporated while mixing continually and as homogeneously as possible. The residual moisture content, including the content of organic solvents, of the xerogel laden with the chromium component should be not more than 20% by weight of volatile constituents, preferably not more than 10% by weight of volatile constituents, based on the xerogel.

Suitable chromium components apart from chromium trioxide and a chromium hydroxide are soluble salts of trivalent chromium with an organic or inorganic acid, e.g. acetates, oxalates, sulfates, nitrates. Particular preference is given to those salts which on activation are converted into chromium(VI) without leaving a residue, e.g. chromium(III) nitrate nonahydrate.

The catalyst obtained in step b) generally has a chromium content of from 0.05 to 5% by weight, preferably from 0.1 to 1.5% by weight, particularly preferably from 0.2% by weight to 1% by weight, based on the total mass of the catalyst.

Step c)

The activation of the catalyst can be carried out in a customary manner under conditions which should be such that the chromium in the finished catalyst is present essentially in the hexavalent state (Cr(VI)).

Activation is preferably carried out at from 400 to 1100° C., preferably from 500 to 800° C., particularly preferably from 600 to 700° C., in a water-free gas stream comprising oxygen in a concentration of above 10% by volume, e.g. in air.

Fluoride Doping

The doping with fluoride can be carried out in step a), in step b) or in step c). In a preferred embodiment, doping is carried out in step b) by applying a fluorinating agent together with the desired chromium component, for example by coimpregnation of the support with a solution of the fluorinating agent and the desired chromium compound.

In a further preferred embodiment, the doping with fluorine is carried out subsequent to the application of the chromium during activation in step c) of the process of the invention. Here, fluoride doping is particularly preferably carried out together with the activation at from 400 to 900° C. in air. A suitable apparatus for this purpose is, for example, a fluidized-bed activator.

Suitable fluorinating agents are all customary fluorinating agents such as $ClF_3$, $BrF_3$, $BrF_5$, $(NH_4)_2SiF_6$ (ammonium hexafluorosilicate), $NH_4BF_4$, $(NH_4)_2AlF_6$, $NH_4HF_2$, $(NH_4)_3PF_6$, $(NH_4)_2TiF_6$ and $(NH_4)_2ZrF_6$. Preference is given to using fluorinating agents selected from among $(NH_4)_2SiF_6$, $NH_4BF_4$, $(NH_4)_2AlF_6$, $NH_4HF_2$, $(NH_4)_3PF_6$. Particular preference is given to using $(NH_4)_2SiF_6$.

The fluorinating agent is generally used in an amount of from 0.5 to 10% by weight, preferably from 0.5 to 8% by weight, particularly preferably from 1 to 5% by weight, very particularly preferably from 1 to 3% by weight, based on the total mass of the catalyst used. The properties of the polymers prepared can be varied as a function of the amount of fluoride in the catalyst.

Furthermore, the invention provides a catalyst for the polymerization of olefins which is obtainable by the process of the invention and provides a process for preparing polyolefins in which the catalyst of the invention is used. This catalyst is suitable for the homopolymerization and copolymerization of olefins, preferably of ethene and $C_3$–$C_8$-α-monoolefins. The catalyst of the invention is particularly preferably used in the polymerization of ethene. The polymerization can be carried out in a customary manner, preferably in suspension or a dry phase. In general, the concomitant use of hydrogen as molecular weight regulator is not necessary, but such regulators can be used in small amounts.

The use of the catalysts of the invention makes it possible to prepare polyolefins which have a balanced property profile. In particular, the copolymerization of ethene with α-olefins using the catalyst of the invention leads to polyethylene having a low flow rate of from 1 to 100 g/10 min, preferably from 1.5 to 50 g/10 min, particularly preferably from 2 to 30 g/10 min. Owing to the low flow rate, these polyethylenes can be processed very readily. The flow rate of the polyethylene formed can be controlled via the fluoride content of the catalyst of the invention. The greater the fluoride content in the catalyst, the lower the flow rate, i.e. the polymer properties can be controlled.

The other polymer properties are also influenced by the doping with fluoride. Thus, the polyethylene obtained using the catalyst of the invention has, for example, a narrower molecular weight distribution than the polyethylene prepared using the corresponding undoped catalysts. Despite the narrow molecular weight distribution, the fatigue properties of the polyolefins prepared using the catalyst of the invention do not deteriorate. Products produced from these polyolefins have a high creep strength. Furthermore, both the impact toughness and the environmental stress cracking resistance are high despite the narrow molecular weight distribution. This is surprising, since according to "Polymere Wirkstoffe", editor H. Batzer, volume III, page 70, Table 1.17, Thieme Verlag, Stuttgart, N.Y., 1984, the impact toughness usually increases with a narrow molar mass distribution while the environmental stress cracking resistance increases with a broader molar mass distribution.

The present invention further provides a process for the polymerization of olefins, in which an olefin or an olefin mixture is polymerized in the presence of the catalyst of the invention.

The polyethylene obtained by the process of the invention has a high environmental stress cracking resistance and a high impact toughness, which deserves particular emphasis since these properties usually run counter to one another, i.e. when the environmental stress cracking resistance is increased, the impact toughness drops, and vice versa. The polyethylene obtained is suitable, for example, for producing blow-molded products such as canisters or other containers which come into contact with solvents or hazardous materials. Furthermore, the polyethylene obtained is suitable for, inter alia, the production of films, pipes, pipe linings and IBCs.

The catalysts prepared by the process of the invention thus make it possible to prepare polyolefins, in particular polyethylene, having optimized product properties. The low flow rate and thus good processability and a high environmental stress cracking resistance together with a high impact toughness deserve particular mention.

The following examples illustrate the invention.

EXAMPLES

1. Preparation of the Silica Xerogel

A mixing nozzle as shown in the figure in DE-A 2 103 243 and having the following data is employed: the diameter of the cylindrical mixing chamber formed by a plastic hose is 14 mm, and the mixing chamber length (including after-mixing section) is 350 mm. A tangential inlet hole having a diameter of 4 mm for the mineral acid is provided close to the inlet end of the mixing chamber, which has a closed end face. Next to this are four further holes likewise having a diameter of 4 mm and the same inflow direction for the water glass solution, with the distance between the holes being 30 mm, measured in the longitudinal direction of the mixing chamber. The ratio of length to diameter for the primary mixing zone is therefore about 10:1. For the adjoining secondary mixing zone, this; ratio is 15. As spray outlet piece, a piece of tube which has been pressed flat into a slight kidney shape is pushed over the outlet end of the plastic hose.

325 l/h of 33% strength by weight sulfuric acid at 20° C. and under an operating pressure of about 3 bar and also 1100 l/h of water glass solution (prepared from technical-grade water glass containing 27% by weight of $SiO_2$ and 8% by weight of $Na_2O$ by dilution with water) having a density of 1.20 kg/l and a temperature of likewise 20° C. and under a pressure of likewise about 3 bar are fed to this mixing apparatus. Neutralization in the mixing chamber lined with the plastic hose forms an unstable hydrosol having a pH of from 7 to 8 and this spends another approximately 0.1 s in the after-mixing zone until completely homogenized before being sprayed into the atmosphere through the nozzle outlet piece as a fanned-out liquid jet. During its flight through the air, the jet breaks up into individual droplets which, owing to the surface tension, take on a largely spherical shape and solidify during their flight within about 1 second to form hydrogel spheres. The spheres have a smooth surface, are clear, contain about 17% by weight of $SiO_2$ and have the following particle size distribution

| | |
|---|---|
| >8 mm | 10% by weight |
| 6-8 mm | 45% by weight |
| 4-6 mm | 34% by weight |
| <4 mm | 11% by weight |

(The particle size distribution can be varied at will by using other nozzle outlet pieces)

At the end of their flight, the hydrogel spheres are collected in a washing tower which is filled virtually completely with hydrogel spheres and in which the spheres are immediately, without aging, washed free of salts with slightly ammoniacal water at a temperature of about 50° C. in a continuous countercurrent process.

The spheres having a diameter in the range from 2 to 6 mm are isolated by sieving and 112 kg of these spheres are placed in an extraction drum with an inlet at the top, a screen bottom and a swan neck-shaped overflow which is connected to the underside of the drum and keeps the liquid level in the drum sufficiently high for the hydrogel spheres to be completely covered with liquid. Ethanol is then fed in at a rate of 60 l/h until the density of the ethanol/water mixture flowing out from the overflow has dropped to 0.826 g/cm$^3$; about 95% of the water present in the hydrogel have then been extracted.

The spheres obtained in this way are then dried (12 hours at 120° C. under a reduced pressure of 20 mbar) until no weight loss occurs over a period of 30 minutes at 180° C. under a reduced pressure of 13 mbar.

The dried spheres are subsequently milled and the xerogel particles having diameters from 40 to 300 μm are isolated by sieving.

Application of the Active Component

The xerogel particles are treated with a 3.56% strength by weight chromium nitrate solution ($Cr(NO_3)_3 \cdot 9H_2O$) in methanol for 5 hours and freed of methanol under reduced pressure, so that the catalyst precursor obtained has a chromium content of 1% by weight of Cr, based on the total mass.

Activation and Doping

Activation is carried out with air at 600 or 650° C. in a fluidized-bed activator. Fluoride doping using 1% by weight or 2% by weight ammonium hexafluorosilicate (ASF) (fluoride content, based on the total mass of the catalyst) is carried out during activation. For the activation, the catalyst precursor is heated to 350° C. over a period of 1 hour, held at this temperature for 1 hour, subsequently heated to the desired activation temperature, held at this temperature for 2 hours and subsequentially cooled, with cooling below 350° C. being carried out under $N_2$.

Table 1 summarizes the catalysts prepared (activation temperature, ASF doping):

TABLE 1

| Catalyst | $T_{act.}$ [° C.] | ASF doping[3)] | Hold time |
|---|---|---|---|
| 1 | 600 | 1% by weight of ASF during act.[2] | 2 h |
| 2 | 600 | 2% by weight of ASF during act. | 2 h |
| 3C[1)] | 600 | — | 2 h |
| 4 | 650 | 1% by weight of ASF during act. | 2 h |
| 5 | 650 | 2% by weight of ASF during act. | 2 h |
| 6C[1)] | 650 | — | 2 h |

[1)]comparative experiment
[2)]% by weight of ASF, fluoride content in ASF, based on the total mass of the catalyst, which are added during activation
[3)]ASF = ammonium hexafluorosilicate

Polymerization Experiments

The polymerization experiments are carried out in a 0.2 m$^3$ PF loop reactor (PF=particle-forming loop reactor). The melt flow rate (HLMFR: 8 to 10 g/10 min) and the density (0.945 to 0.948 g/cm$^3$) are set via the hexene concentration or ethene concentration in the suspension medium (isobutane). All catalyst variants are polymerized at a constant reactor temperature of 103.8° C. The reactor pressure is 39 bar. The polymer output is from 22 to 24 kg/h. For optimum mixing of the contents of the reactor, a Grassel pump is operated at 2100 rpm.

Table 2 shows the reactor temperature and the polymer analysis of the batches prepared in the 0.2 m$^3$ loop reactor using ASF-modified catalysts and for comparative experiments (C).

TABLE 2

| Catalyst | P/C [g/g of cat.][1)] | $T_{act.}$ [° C.] | HLMFR [g/10'][2)] | [η] [dl/g][3)] | Density [g/ml] | BD [g/l][4)] | $M_w$[5)] [g/mol] | $M_n$[6)] [g/mol] | Q[7)] |
|---|---|---|---|---|---|---|---|---|---|
| 1 | 3500 | 103.8 | 5.9 | 4.15 | 0.9437 | 527 | 400216 | 19964 | 20.0 |
| 2 | 4800 | 103.8 | 5.4 | 3.96 | 0.9443 | 520 | 422888 | 25960 | 16.3 |
| 3C | 2800 | 103.8 | 6.4 | 4.14 | 0.9448 | 522 | 400053 | 18359 | 21.7 |
| 4 | 4100 | 103.8 | 9.4 | 3.64 | 0.9443 | 509 | 322753 | 25687 | 12.6 |
| 5 | 5100 | 103.8 | 8.3 | 3.56 | 0.9438 | 510 | 330264 | 21140 | 15.6 |
| 6C | 3300 | 103.8 | 8.1 | 3.81 | 0.9454 | 511 | 371850 | 17623 | 21.1 |

1)ratio of polymer/catalyst;
2)melt flow rate;
3)viscosity;
4)bulk density;
5)weight average molecular weight;
6)number average molecular weight;
7)$\frac{M_w}{M_n}$ = polydispersity Table 3 shows the notched impact toughness (azk) and the environmental stress cracking resistance (ESCR) of polyethylene prepared using the catalysts of the invention and using comparative catalysts.

TABLE 3

| Catalyst | ESCR[1)]/[h] | azk[2)], 23° C. [kJ/m²] | azk[2)], −30° C. [kJ/m²] |
|---|---|---|---|
| 1 | 43[3)] (>576[4)]) | 251 | 177 |
| 2 | 46[3)] | 276 | 191 |
| 3C | 33[3)] (>576[4)]) | 222 | 147 |
| 5 | 24[3)] | — | — |
| 6C | 19[3)] | 195 | 127 |

1)environmental stress cracking resistance;
2)notched impact toughness;
3)circular ESCR disks of ZKP/P at 80° C./3 bar;
4)circular ESCR disks of ZKP/P at 50° C./3 bar The polyethylene prepared using the catalysts of the invention has, in particular, a high environmental stress cracking resistance combined with high notched impact toughness compared to the polyethylene prepared in the comparative experiments.

Test Methods

The melt flow rate (HLMFR=high load melt flow rate) was determined in accordance with ISO 1133 at 190° C. under a load of 21.6 kg (190° C./21.6 kg).

The density [g/cm³] was determined in accordance with ISO 1183.

The Staudinger index (η) [dl/g] was determined in accordance with ISO 1628 (at 130° C., 0.001 g/ml in decalin).

The bulk density (BD) [g/l] was determined in accordance with DIN 53468.

The impact toughness (azk) [kJ/m²] was determined in accordance with ISO 180/1A.

The environmental stress cracking resistance (ESCR) was determined by the round disk dart test (RD) of Elenac CAL in accordance with the method laid down in the QM manual of Elenac CAL Test conditions: 50° C. or 80° C./3 bat/5% of Lutensol FSA, 10/2 mm pressed plate (scored).

The determination of the molar mass distributions and the means ($M_n$, $M_w$ and $M_w/M_n$ derived therefrom was carried out by means of high-temperature gel permeation chromatography (GPC) using a method based on DIN 55672 under the following conditions: solvent: 1,2,4-tri-chlorobenzene, flow: 1 ml/min, temperature: 140° C., calibration using PE standards.

What is claimed is:

1. A process for preparing a catalyst for the polymerization of olefins, which comprises:

a) preparation of a finely divided silica xerogel by a1) use of a particulate silica hydrogel which contains from 10 to 25% by weight of solid (calculated as $SiO_2$), is largely spherical and has a particle diameter of from 1 to 8 mm and is obtained by a11) introduction of a sodium or potassium water glass solution into a rotating stream of an aqueous mineral acid, both longitudinally and tangentially to the stream, a12) spraying of droplets of the resulting silica hydrosol into a gaseous medium, a13) allowing the sprayed hydrosol to solidify in the gaseous medium, a14) freeing the resulting largely spherical hydrogel of salts without prior aging by washing, a2) extraction of at least 60% of the water present in the hydrogel by means of an organic liquid, a3) drying of the resulting gel [up to] *until the dried product experiences no further weight loss at* 180° C and a reduced pressure of 13 mbar [no further weight loss occurs over a period of] *for* 30 minutes (xerogel formation)

a4) adjustment of the particle diameter of the xerogel obtained to from 20 to 2000 μm, b) loading of the xerogel with chromium from a solution of chromium trioxide or a chromium compound which is converted into chromium trioxide under the conditions of step c), and c) activation of the resulting product at from 400 to 1100° C. in a water-free gas stream comprising oxygen in a concentration of above 10% by volume, wherein a fluoride doping with a fluorinating agent is carried out in step c) together with the activation at 400 to 900° C. in air.

2. The process as claimed in claim 1, wherein a silica hydrogel having a solids content of from 12 to 20% by weight is used in step a).

3. The process as claimed in claim 2, wherein the extraction in step a) is carried out by means of an organic liquid selected from the group consisting of $C_1$-$C_4$-alcohols and $C_3$-$C_5$-ketones.

4. The process as claimed in claim 3, wherein the extraction in step a) is carried out by means of an organic liquid containing less than 3% by weight of water.

5. The process as claimed in claim 4, wherein the application of the chromium trioxide to the xerogel in step b) is carried out from a 0.05–15% strength by weight solution of chromium trioxide in a $C_3$–$C_5$-ketone or from a 0.05–15% strength by weight solution of a chromium compound which is converted into chromium trioxide under the conditions of step c) in a $C_1$–$C_4$alcohol, where the respective solvent must contain no more than 20% by weight of water.

6. The process as claimed in claim 5, wherein the fluorinating agent is $(NH_4)_2SiF_6$, $NH_4BF_4$, $(NH_4)_2AlF_6$, $(NH_4)_3PF_6$ or $NH_4HF_2$.

7. The process as claimed in claim 6, wherein the fluorinating agent is used in an amount of from 0.5 to 10% by weight, based on the total mass of the catalyst.

8. A catalyst for the polymerization of olefins which is obtained by the process as claimed in claim 7.

9. The process as claimed in claim 1, wherein the extraction in step a) is carried out by means of an organic liquid selected from the group consisting of $C_1$–$C_4$-alcohols and $C_3$–$C_5$-ketones.

10. The process as claimed in claim 1, wherein the extraction in step a) is carried out by means of an organic liquid containing less than 3% by weight of water.

11. The process as claimed in claim 1 wherein the application of the chromium trioxide to the xerogel in step b) is carried out from a 0.05–15% strength by weight solution of chromium trioxide in a $C_3$–$C_5$-ketone or from a 0.05–15% strength by weight solution of a chromium compound which is converted into chromium trioxide under the conditions of step c) in a $C_1$–$C_4$-alcohol, where the respective solvent must contain no more than 20% by weight of water.

12. The process as claimed in claim 1, wherein the fluorinating agent is $(NH_4)_2SiF_6$, $NH_4BF_4$, $(NH_4)_2AlF_6$, $(NH_4)_3PF_6$ or $NH_4HF_2$.

13. The process as claimed in 1, wherein the fluorinating agent is used in an amount of from 0.5 to 10% by weight, based on the total mass of the catalyst.

14. A catalyst for the polymerization of olefins which is obtained by the process as claimed in claim 1.

* * * * *